United States Patent [19]

Kimura et al.

[11] Patent Number: 5,117,097
[45] Date of Patent: May 26, 1992

[54] KEY SYSTEM FOR A VEHICLE

[75] Inventors: Takashi Kimura; Toshiaki Nawa, both of Aichi, Japan

[73] Assignee: Kabushiki Kaisha Tokai Rika Denki Seisakusho, Aichi, Japan

[21] Appl. No.: 657,869

[22] Filed: Feb. 20, 1991

[30] Foreign Application Priority Data

Feb. 27, 1990 [JP] Japan ............... 2-18245[U]
Mar. 14, 1990 [JP] Japan ............... 2-25825[U]
Mar. 28, 1990 [JP] Japan ............... 2-31115[U]

[51] Int. Cl.⁵ ............ G06K 7/00; G06K 19/06; E05B 49/00
[52] U.S. Cl. .................... 235/439; 235/449; 235/493; 70/278
[58] Field of Search ........... 235/380, 439, 449, 492, 235/493, 382, 382.5; 70/277, 278, 454, 254, 413, 59; 362/100

[56] References Cited

U.S. PATENT DOCUMENTS

| | | | |
|---|---|---|---|
| 3,270,191 | 8/1966 | Hilliard | 70/454 |
| 3,748,878 | 7/1973 | Balzano et al. | 70/277 |
| 4,176,782 | 12/1979 | Fukuda et al. | 235/493 |
| 4,200,227 | 4/1980 | Lemelson | 235/382 |
| 4,234,909 | 11/1980 | Cotroneo | 362/600 |
| 4,257,030 | 3/1981 | Bruhin et al. | 235/382 |
| 4,326,124 | 4/1982 | Faude | 235/382 |
| 4,659,915 | 4/1987 | Fues | 235/492 |
| 4,686,358 | 8/1987 | Seculinger et al. | 235/382 |
| 4,810,861 | 3/1989 | Herriott et al. | 235/454 |
| 4,918,955 | 4/1990 | Kimura et al. | 70/413 |
| 4,937,437 | 6/1990 | Ferguson | 235/492 |
| 5,003,801 | 4/1991 | Stinar et al. | 70/278 |

FOREIGN PATENT DOCUMENTS

| | | | |
|---|---|---|---|
| 3401827 | 7/1986 | Fed. Rep. of Germany | 362/100 |
| 60-72867 | 5/1985 | Japan | |
| 63-93649 | 4/1988 | Japan | |

Primary Examiner—Stuart S. Levy
Assistant Examiner—Tan Nguyen
Attorney, Agent, or Firm—Finnegan, Henderson, Farabow, Garrett and Dunner

[57] ABSTRACT

A key system provided with the key, a magnetic core, a cylinder body and the magnetic field generation coil. In the key system communication is performed through magnetic coupling between the key and a cylinder so as to drive a controlled object. An inductance and capacitance resonance (LC) circuit having intrinsic resonance points as key information is mounted in the head of the key. The magnetic core is secured to the outside circumferential surface of a rotor at the key insertion hole thereof so as to form a magnetic circuit in cooperation with the key when the key is inserted into the key insertion hole.

8 Claims, 5 Drawing Sheets

KEY SYSTEM FOR A VEHICLE

BACKGROUND OF THE INVENTION

The present invention relates to a key system for a vehicle, particularly to a key system for a vehicle capable of precisely receiving information stored in a key and preventing the key system from malfunctioning due to a noise, and preventing the vehicle from being stolen by a thief.

RELATED ART

A vehicle such as a motor vehicle is likely to be stolen because the driver sometimes forgets to lock the vehicle or it may dishonestly be unlocked. To prevent such a problem, various key systems have been proposed. Some of the key systems are of the bar code type and the electromagnetic coupling type, in each of which information stored in a key is read through non-contact operation, as disclosed in the U.S. Pat. No. 4,200,227, Japanese Unexamined Utility Model application (OPI) No. 60-72867 or the Japanese Unexamined Patent application (OPI) No. 63-93649 (the term "OPI" as used herein means an "unexamined published application").

In these conventional key systems of the electromagnetic coupling type, communication is performed through magnetic coupling between a key cylinder and a key so as to operate a controlled object. The key cylinder of this type has a rotor and an annular core disposed around the rotor. A magnetic field generation coil is provided around the annular core so that magnetic fluxes cancel each other. A variable frequency oscillator is connected to the magnetic field generation coil. The key is provided with a shaft-like core which is located close to the annular core when the key is inserted into the key insertion hole of a rotor. The key coil for forming a circuit, which resonates at a prescribed frequency, is provided around the shaft-like core to read information for identifying the key.

When the key is inserted into the key insertion hole, the shaft-like core is located near the annular core so that the annular core is magnetically divided by the shaft-like core, thereby causing two magnetic circuits having magnetic field generation coil the winding direction of which are the same as each other with the shaft-like core as a common magnetism path. When an electrical current having a predetermined frequency band is supplied from the variable frequency oscillator to the magnetic field generation coil, magnetic fluxes are generated by the magnetic field generation coil flow in the shaft-like core so that an electrical current having the predetermined frequency band flows through the key coil. Under this condition, if the output frequency of the oscillator is varied, the resonance takes place at the predetermined frequency. The key system is then unlocked by detecting the resonance frequency.

The key system of the electromagnetic coupling type thus communicates between the key cylinder side and the key side. Since the direction of the magnetic field generated by each of the magnetic filed generation coils is unchanged in the key system of this type, the quantity of the magnetic flux which flows in the shaft-like core varies according to the rotation of the key. In other words, the quantity of the magnetic flux is maximized when the direction of the shaft-like core is coincident with that of the magnetic field. The quantity of the magnetic flux decreases according to the increase of the rotating angle of the key from its initial position. In that case, the magnitude of the electrical current flowing through the key coil also decreases and, accordingly, the quantity of energy imparted to the key drops. For that reason, a key information signal disadvantageously falls in magnitude to thereby deteriorate the ratio of the signal to a noise, to make it difficult to read the key information precisely.

If the conventional key system of the electromagnetic coupling type is constituted so that the magnetic field generation coil moves following to the movement of the key, there causes another problem that an electric wire for connecting the wound wire of the coil to an external electric circuit is cut off due to the stress of bending such as twisting at every time of the movement of the coil, or the coating of the electric wire is rubbed and worn by a part of the key cylinder body to thereby expose a portion of the conductor of the wire and put the exposed portion into contact with a metal member to cause an electricity leak.

In the conventional key system of the electromagnetic coupling type in which the magnetic field generation coil consisting of a ring coil and the key coil consisting of a bar coil are positioned close to each other to be magnetically coupled with each other, the ring coil is surrounded by a metal and positioned closely in contact with a rotor case when the key is inserted into the key insertion hole of the rotor. For that reason, the magnetic flux generated by the ring coil partially flows through the metal so that a loss occurs to reduce the coupling Q value of the key system. This is also a problem. Furthermore, if the ring coil is provided in the cylinder, the key system suffers from a problem that a construction for taking out a part of the wound wire of the coil from the cylinder is complicated to deteriorate the assembling property of the device.

Figure 1:
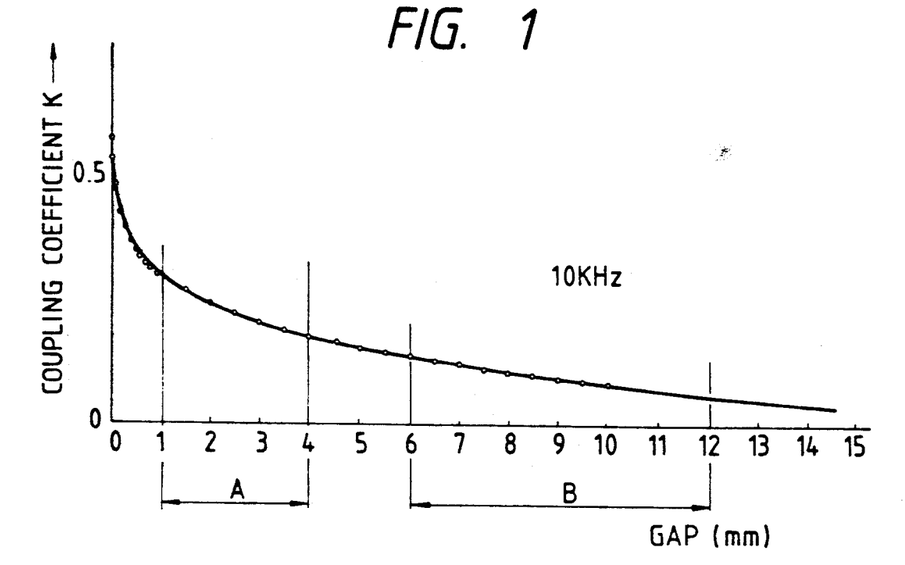
FIG. 1 is a graph showing the relationship between a gap and a coupling coefficient at the frequency of 10 KHz.

On the other hand, if the relationship between the coefficient k of the magnetic coupling of the magnetic field generation coil at the cylinder and the key coil provided in the key and the gap between the coils is set in a range A in which the coefficient k is large as shown in FIG. 1, the degree of the magnetic coupling is made high to increase the quantity of energy imparted to the key, to improve the signal-to-noise ratio of the device. However, if the gap slightly changes due to the dimensional inaccuracy of the components, the play thereof during assembling or the like, the coefficient k greatly changes to cause the magnitude of the signal to be so irregular that the information can be judged only in terms of the frequency of the resonance.

SUMMARY OF THE INVENTION

In view of the foregoing problems and deficiencies accompanying the conventional key system, the primary object of the present invention is to provide a key system for a vehicle in which the magnitude of an output signal is prevented from decreasing due to the rotation of a key, and an electric wire connecting a coil and an external electric circuit to each other does not receive the stress of twisting nor is worn, at the time of manipulation of the key.

It is another object of the invention to provide a key system for a vehicle in which the drop in the degree of the magnetic coupling of a ring coil and a key coil is held down to obtain a high Q value, and it is easy to assemble the device.

It is still another object of the invention to provide a key system for a vehicle in which the change in the magnitude of a signal due to a mechanical error such as the dimensional inaccuracy of the component and the play thereof during assembling in the assembled state thereof is suppressed to make it possible to process the signal in various manners.

The above and other objects can be attained by a provision of the key system which, according to the invention is provided with the key, a magnetic core, a cylinder body and the magnetic field generation coil. In the key system of the present invention, communication is performed through magnetic coupling between the key and a cylinder so as to drive a controlled object. An inductance and capacitance resonance (LC) circuit having intrinsic resonance frequency as key information is mounted in the head of the key. The magnetic core is secured to the outside circumferential surface of a rotor at the key insertion hole thereof so as to form a magnetic circuit in cooperation with the key when the key is inserted into the key insertion hole. The cylinder body houses the rotor, and is provided with a cover surrounding the magnetic core. The magnetic field generation coil is provided with a bobbin loosely fitted on the magnetic core and having a cylindrical portion for taking out a part of the wound wire of the coil. The cover has a hole communicating with the exterior of the cylinder body. The cylindrical portion of the bobbin is fitted through the hole of the cover so that the part of the wound wire of the magnetic field generation coil is taken out to the exterior of the cylinder body.

Since the cylindrical portion of the bobbin is fitted through the cover, the bobbin does not move at the time of the rotation of the rotor by the key although the magnetic core moves along with the rotation of the rotor. For that reason, a magnetism path constituted by the key and the magnetic core is always unchanged so that substantially all of the magnetic field generated by the magnetic field generation coil acts to the key coil to result in maintaining the energy of the signal for the key information to improve the ratio of the signal to the noise. Since the bobbin is unmovably secured, an external force for manipulating the key does not act to the wound wire to cut it off or cause an electricity leak.

DESCRIPTION OF THE PREFERRED EMBODIMENTS

Preferred embodiments of the present invention will now be described in detail with reference to the accompanying drawings.

FIGS. 2, 3, 4, 5, 6 and 7 show a key system for a vehicle according to the first embodiments of the invention. The key system is generally constituted by a key 40 and a key cylinder body 10. The key cylinder body 10 is provided with a rotor 12 for mechanically judging whether the key 40 is proper and a magnetic field generation coil unit 14 for reading key information. The magnetic field generation coil unit 14 is mounted in the cylinder body 10 surrounding the rotor 12. The key 40 has in a head portion 40B thereof an inductance and capacitance (LC) resonance circuit 46 having a plurality of intrinsic resonance points including those for the key information on locking, unlocking, identification and so forth.

Figure 4:
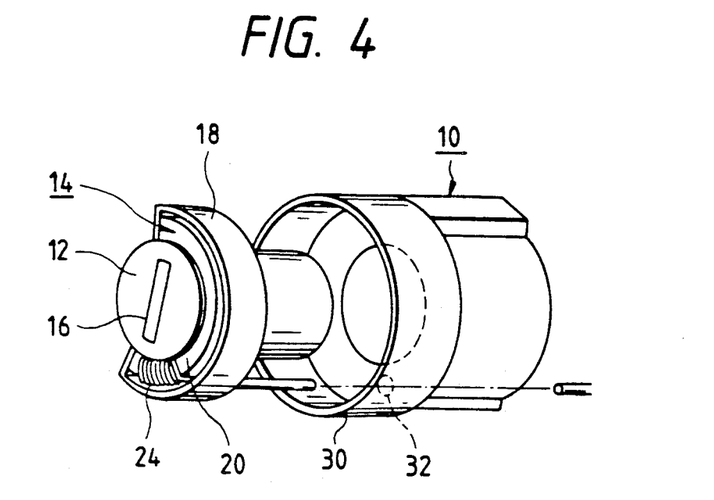
FIG. 4 is an exploded perspective view of the device.
Figure 5:
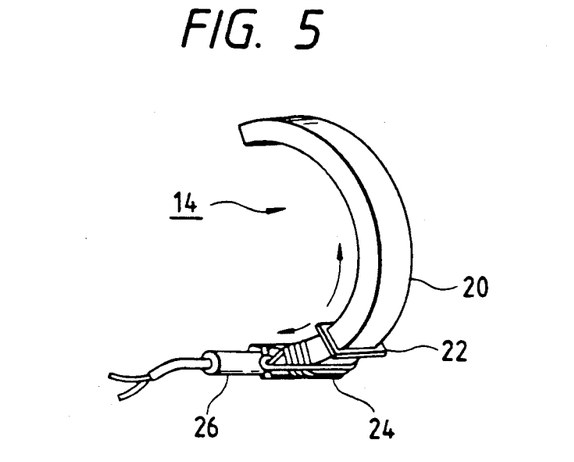
FIG. 5 is a perspective view of the magnetic field generation coil.

As shown in FIG. 5, the coil unit 14 is constituted by a substantially semicircular magnetic core 20 which is formed of ferrite and located in a rotor case 18, and a bobbin 22 on which a wire 24 is wound. The dimension of the inner opening of the bobbin 22 is slightly larger than that of the magnetic core 20. The core 20 is loosely fitted in the inner opening of the bobbin 22 so that they are movable relative to each other. The bobbin 22 is integrally formed with a cylindrical member 26 for leading the wound wire 24 along the axis of the cylinder body 10. The end face of the magnetic core 20 is located at the inlet end of the key insertion hole 16 of the rotor 12, and the core is housed in the rotor case 18, as shown in FIG. 4.

Figure 6:
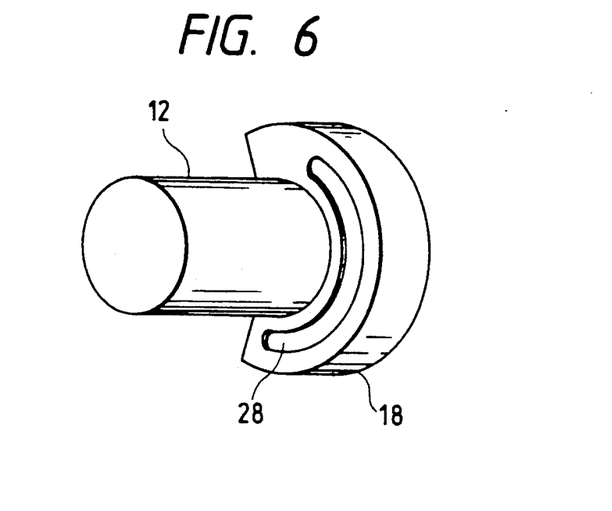
FIG. 6 is a perspective view of the rotor of the device.

As shown in FIG. 6, the rotor case 18 is arc shaped and secured to the outside circumferential surface of the rotor 12 so that the key insertion hole 16 thereof is not covered with the rotor case. The rear portion of the rotor case 18 has an arc-shaped slit 28 and the cylindrical member 26 of the bobbin 22 passes through the slit.

Figure 3:
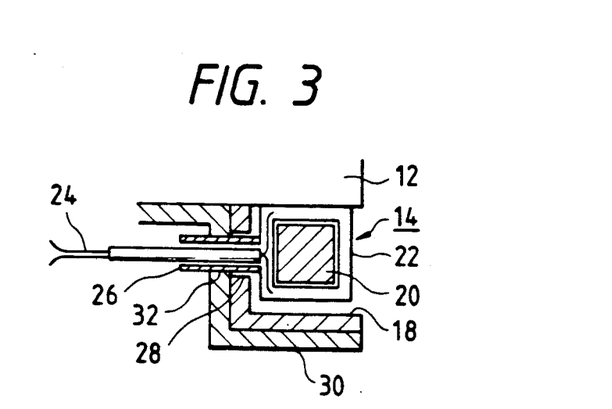
FIG. 3 is an enlarged sectional view of the magnetic field generation coil and bobbin of the device.
Figure 7:
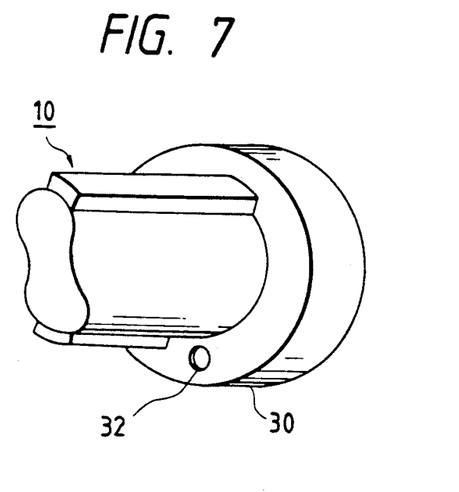
FIG. 7 is a perspective view of the cylinder body of the device.

The cylinder body 10 has a cover 30 which accommodates the front portion of the rotor 12, as shown in FIG. 7. The cover 30 is provided with a lead wire hole 32 the position of which corresponds to that of the arc-shaped slit 28 of the rotor case 18. As shown in FIG. 3, the lead wire hole 32 communicates with the exterior space on the outside circumferential surface of the cylinder body 10. The cylindrical member 26 of the bobbin 22 positions at the outer portion of the cylinder body 10 when the cylindrical member passes through the lead wire hole 32. The bobbin 22 is attached to the cylinder body 10 by inserting the cylindrical member 26 into the lead wire hole 32.

Figure 2:
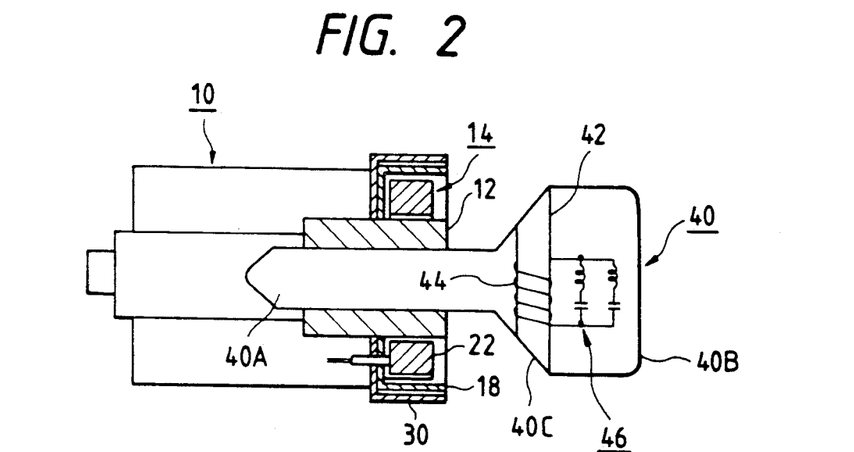
FIG. 2 is a schematic view of a key system which is the first embodiment of the present invention.

As shown in FIG. 2, the key 40 is constituted by an inserting portion 40A, which is inserted into the key insertion hole 16 of the rotor 12, and the head 40B for manipulating the key. The head 40B of the key 40 has an inner end face 40C, which is located close to the end surfaces of the magnetic core 20 at the time when the key 40 is inserted into the rotor 12 so that a magnetic air gap is defined between the inner end face 40C of the head 40B of the key 40 and each end surface of the magnetic core 20 of the magnetic field generation coil unit 14. A shaft-like core 42 is provided in the head 40B of the key 40 so that the core 42 is exposed at both the ends thereof on the inner end face 40C of the head. A key coil 44 is provided around the shaft-like core 42 of the key 40 and connected to the LC resonance circuit 46 for detecting the key information. When the key 40 is completely inserted into the key insertion hole 16 of the rotor 12, both the ends of the shaft-like code 42 are located close to the magnetic core 20 so that both the cores are magnetically coupled with each other.

The operation of the key system according to the first embodiment will now be described in detail.

When the key 40 is inserted into the key insertion hole 16 of the rotor 12 and turned, the rotor 12 is rotated together with the magnetic core 20. At that time, the bobbin 22 for the wound wire 24 is not moved along with the rotation of the rotor 12 because the cylindrical member 26 of the bobbin passes through the lead wire hole 32 of the lower portion of the cover 30 of the cylinder body 10. The magnetic core 20 slides in the bobbin 22 along with the rotation of the rotor case 18 because the cylindrical member 26 of the bobbin passes through the lead wire hole 32. For that reason, the degree of the magnetic coupling of the magnetic core 20 and the shaft-like core 42 provided in the key 40 does not vary even if the magnetic core rotates, so that the magnetic flux applied through the key coil 44 does not decrease. Accordingly, a level of signal to be read does not drop.

Figure 8:
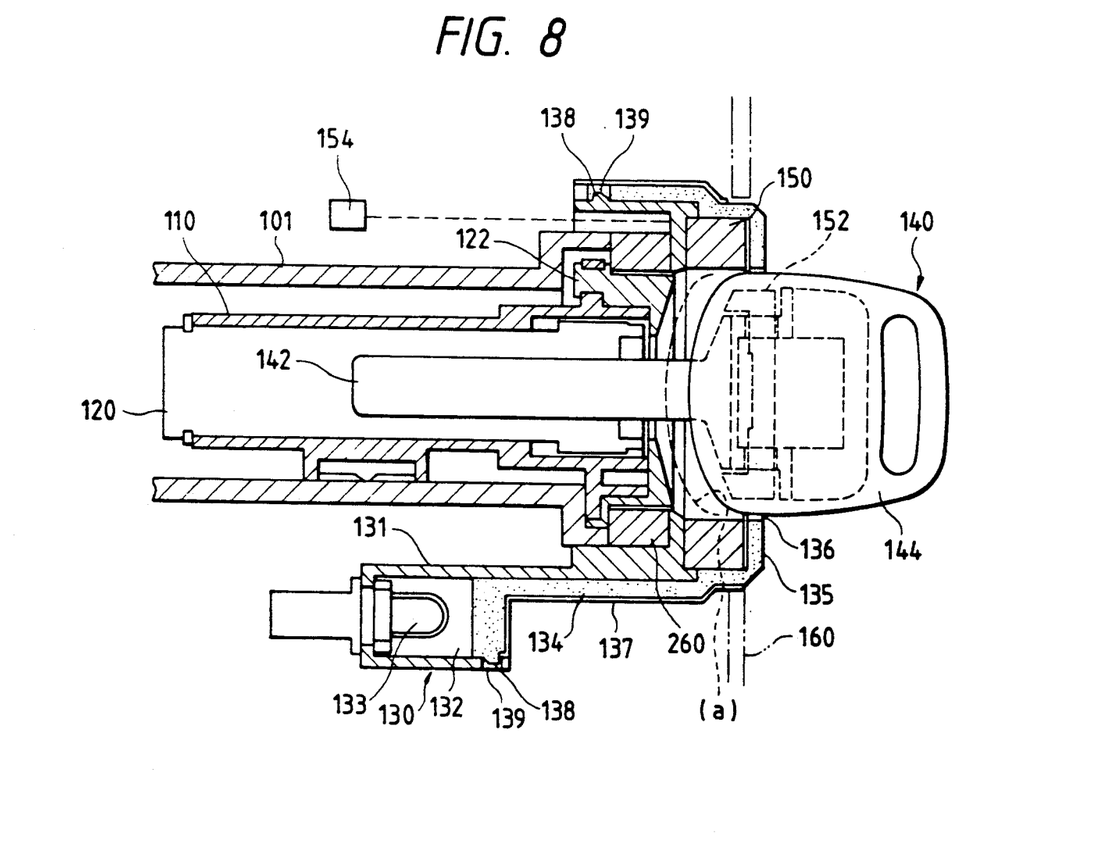
FIG. 8 is a sectional view of a key system which is for a vehicle and is the second embodiment of the present invention.
Figure 9:
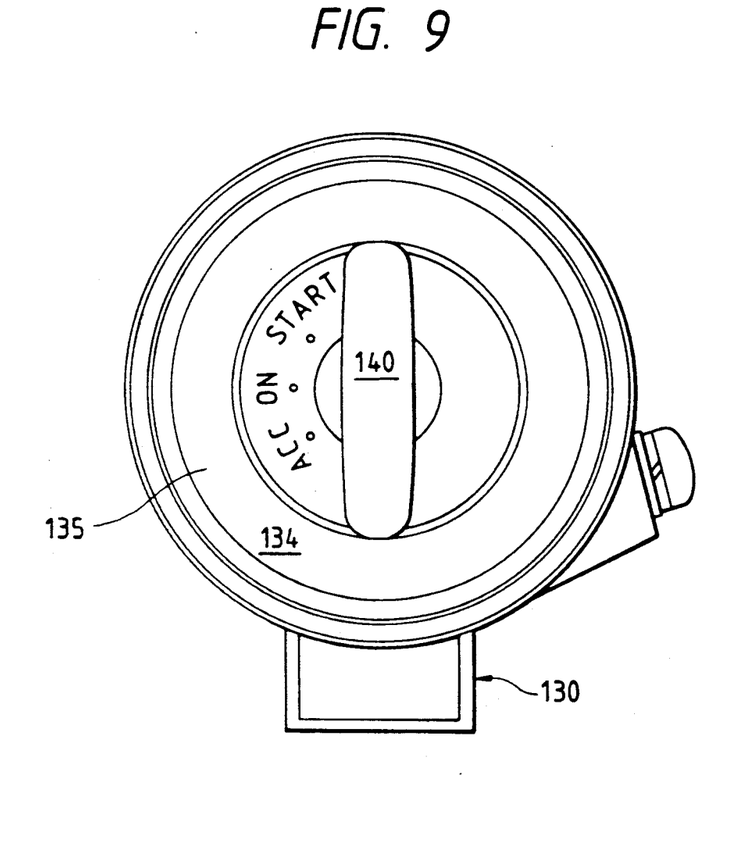
FIG. 9 is a front view of the device shown in FIG. 8.
Figure 10:
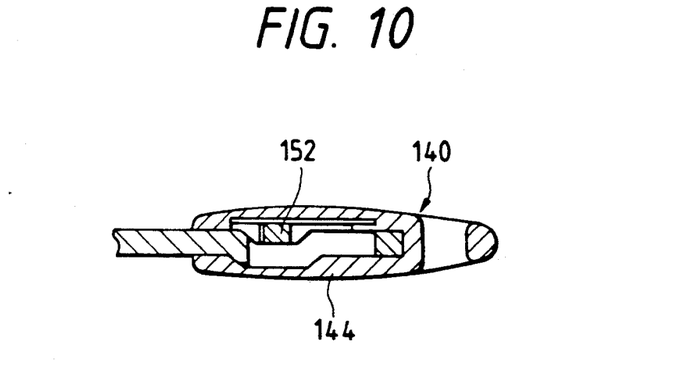
FIG. 10 is a sectional view of the head of the key of the device shown in FIG. 8.

FIGS. 8, 9 and 10 show a key system for a vehicle which is the second embodiment of the invention.

FIG. 8 is a sectional view of the key system in which a ring coil 150 is provided around a cylinder 110. The key system is generally constituted by the cylinder 110, a rotor 120, indicator lamp unit 130, a key 140 and a communication unit.

The rotor 120 is fitted in the cylinder 110. A rotor case 122 is mounted on the cylinder 110 close to the inlet end of the key insertion hole of the rotor 120. The rotor case 122 supports the rotor 120 and allows the rotor to rotate.

The indicator lamp unit 130 is provided with a bulb case 131, a bulb 133 provided on the bulb fitting portion 132 of the case 131, and an illumination ring 134 formed of plastic resin. The illumination ring 134 is attached to the bulb case 131 and exposed to the driver's room of the vehicle. The indicator lamp unit 130 is positioned outside the rotor case 122 concentrically thereto. The illumination ring 134 has an annular illumination front portion 135 having a hole 136 so that a small gap is defined between an inner edge of the front portion 135 and the head 144 of the key 140 while the key is inserted into the key insertion hole of the rotor 120. The outside circumferential surface of the illumination ring 134, which is located inside an instrument panel 160 of the vehicle facing the driver, is surrounded by a ring case 137 which prevents the illumination light from the bulb 133 from diffusing outward. As a result, the light emitted by the bulb 133 is reflected and refracted so that the light is guided to the annular illumination front portion 135 of the illumination ring 134 to annularly illuminate the key insertion hole of the rotor 120 and also the key 140 inserted therein.

The communication unit includes the ring coil 150 positioned at the vehicle side, a key information processing circuit provided in the vehicle but not shown in the drawings, a key coil 152 provided in the key 140, and a resonance circuit provided in the key but not shown in the drawings. The ring coil 150 is provided in an annular space between the front of the bulb case 131 and the inside surface of the illumination ring 134. The end portions of the wound wire of the ring coil 150 pass through between the bulb case 131 and a cylinder case 101, are coupled to a connector 154. After the ring coil 150 is put in the illumination ring 134, the bulb case 131 fitted with the bulb 133 is mounted in the illumination ring 134 so that projections 138 of the ring 134 are engaged with respective holes 139 of the case 131 to couple the case 131 and the ring 134 to each other so that the ring coil 150 is pinch-held by the case and the ring.

The key 140 is provided with an inserting portion 142 which is inserted into the rotor 120, and a head 144 in which the key coil 152 of the communication unit and the LC resonance circuit thereof are installed. The key coil 152 is disposed in the inner portion of the head 144. The resonance circuit, which is formed on a substrate (not shown) and connects to the key coil 152, is disposed at nearly the center of the head 144. The key coil 152 and the substrate are sealed in the head 144 by molding. A bar core for the key coil 152 is oriented in the radial direction of ring coil 150 while the key 140 is inserted into the rotor 120. Both the ends of the bar core are located outside the metal part of the key 140 and, therefore, the magnetic flux generated by the ring coil 150 and applied to the bar core does not decrease by the metal part. When the key 140 is completely inserted into the rotor 120 as shown by a dotted line (a) in FIG. 8, both the end faces of the bar core of the key coil 152 are located close to the inside circumferential surface of a ring core 150 so that the ring coil 150 and the key coil 152 are magnetically coupled to each other.

After the cylinder 110 fitted with the rotor 120 inside thereof is mounted in the cylinder case 101, the indicator lamp unit 130 fitted with the ring coil 150 is mounted on the cylinder case 101 so that a spacer 260 is interposed between the lamp unit 130 and the cylinder case 101.

Figure 11:
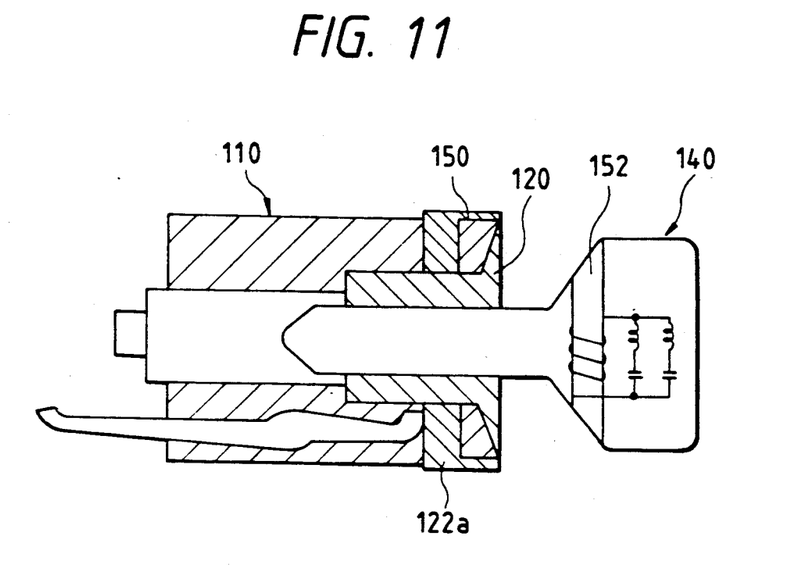
FIG. 11 is a sectional view of a key system which is for a vehicle and is a modification of the device shown in FIG. 8.

FIG. 11 shows a key system for a vehicle according to another arrangement of the invention. In FIG. 11, like parts and components as that in FIG. 8 are designated by the same reference numerals and the detail description is omitted. In the key system shown in FIG. 11, the outside diameter of a ring coil 150 is smaller than that of a cylinder 110. The ring coil 150 is disposed around a rotor 120 at the outer end of the cylinder 110. A key coil 152, which is located near the ring coil 150, is provided in the key 140 of the key system. An inductance and capacitance resonance circuit for reading information for identifying the key system is connected to the key coil 152. When the indicator lamp unit of the key system is assembled, the end portions of the wound wire of the ring coil 150 are pulled out of the bulb case of the lamp unit and connected to an external circuit through a connector and, thereafter, the lamp unit is assembled to a cylinder case. Thus, the connection of the wound wire to the external circuit can be performed outside the cylinder case. For these reasons, the efficiency of the assembly of the key system is improved.

Further, since the ring coil 150 is coupled to the indicator lamp unit 130 according to the second embodiment, the ring coil and the lamp unit can unitary be assembled to thereby simplify the construction of the key system. Furthermore, since the illumination ring 134 is made of plastic, it does not affect the magnetic coupling of the ring coil 150 and the key coil 152, so that the loss in energy is reduced to obtain a higher Q value.

The operation of the second embodiment will be described in detail hereinbelow.

When the key 140 is inserted into the key insertion hole of the rotor 120, the bar core 152 of the key 140 is located close to the ring core 150 of the cylinder 110 so that they are magnetically coupled to each other thereby generating a magnetic circuit with a bar core and a joint magnetism path is formed.

Under this condition, when an electrical current having a predetermined frequency band is applied from a variable frequency oscillator to the ring coil 150, a magnetic flux is generated on the bar core of the key coil 152 through the ring core so that an electrical current having the predetermined frequency band comes to flow through the key coil 152. Under this condition, if the output frequency of the variable frequency oscillator is then varied, resonance occurs at a predetermined frequency, in terms of which the key system judges as unlocked.

The degree of the magnetic coupling of the ring coil 150 and the key coil 152 will now be described.

When the ring coil 150 and the key coil 152 face each other, a coupling coefficient k indicative of the degree of the magnetic coupling changes depending on the positional relationship between the coils or on the gap between them, as shown in FIG. 1. If the gap is small, the coupling coefficient k changes largely in a range A shown in FIG. 1. If the gap is large, on the other hand, the coupling coefficient k hardly changes in a range B shown in FIG. 1.

Figure 12A:
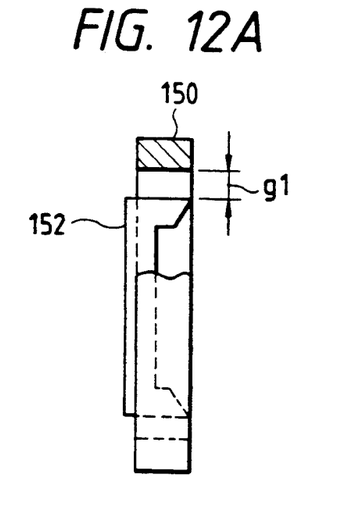
FIGS. 12A and 12B are graphs for explaining the coefficient of the magnetic coupling of a ring coil and a key coil.
Figure 12B:
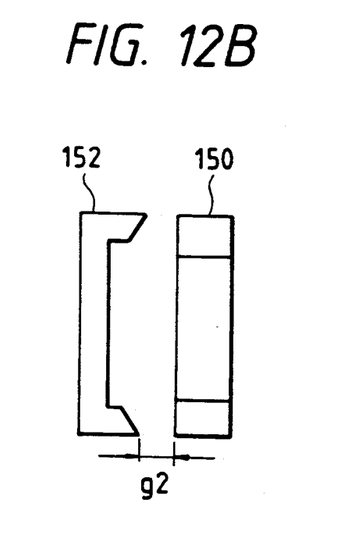

FIG. 12A shows the positional relationship between the bar core and ring core of the key system shown in FIG. 8, at the time of the insertion of the key into the rotor. FIG. 12B shows the positional relationship between the bar core and ring core of the modification of the second embodiment, at the time of the insertion of the key into the rotor. As for the key system shown in FIG. 12A, an air gap $g_1$ is defined between the inside circumferential surface of the ring core and each of both the end surfaces of the bar core. As for the key system shown in FIG. 12B, an air gap $g_2$ is defined between the side surface of the ring core and each of both the end edges of the bar core.

When each of the gaps $g_1$ and $g_2$ is set in the range B shown in FIG. 1, preferably between 6 to 12 mm, the coupling coefficient can substantially be fixed at a prescribed value even if the gap has a dimensional inaccuracy due to the inaccuracy of the dimensions or/and assembly of the components of the key system, the change in the degree of the insertion of the key, and so forth.

Although a characteristic curve shown in FIG. 1 is at the frequency of 10 KHz, the coupling coefficient remains nearly unchanged with the gap between the range of 6 to 12 mm even if the frequency is changed to 100 KHz. Therefore, the frequency to be used can freely be chosen if setting the gap at 6 to 12 mm. Since the gap is set as mentioned above, not only the frequency of the resonance but also the magnitude and sharpness of the resonance and the area of the wave form of the resonance can be utilized to judge of key information so as to avoid wrong operation due to noise, to enhance the reliability and theft preventing property of the key system.

In each of the key systems described above, the magnetic core attached to the rotor slidably mounted in the bobbin secured to the cylinder. For that reason, the magnetic flux generated by the magnetic field generation coil flows effectively through the shaft-like core provided in the key, so that a key information signal can be read out at a prescribed level and easily judged. Besides, since the ring coil is disposed outside the cylinder so as not to interpose any metal between the ring coil and the key coil, the drop in the degree of the magnetic coupling of the ring coil and the key coil is reduced to obtain a high Q value. As a result, processing for detecting a point of resonance is facilitated to enhance the reliability of the key system. Since the ring coil is disposed outside the cylinder, the end portions of the wound wire of the coil can be directly taken out from the cylinder case so as to be easily connected to the external circuit. The gap between the ring coil and the key coil at the insertion of the key can be set at 6 to 12 mm to fix the magnitude of the resonance and that of the signal to facilitate processing for judgement on information and enhance the theft preventing property of the device.

What is claimed is:

1. A key system of an electromagnetic coupling type, comprising:
    a key for storing key information, said key having an inserting member and a head to be operated;
    cylinder means for electromagnetically communicating with said key, said cylinder means including:
        a cylinder body having a key insertion hole into which said inserting member of said key is inserted;
        a rotor for receiving said key, said rotor being rotatable with said key;
        a magnetic core for forming a magnetic circuit with said key, said magnetic core surrounding said rotor, said magnetic core being rotatable with said rotor; and
        means for generating a magnetic field, said magnetic field generating means being substantially unmovable with respect to said rotor, said magnetic field generating means including:
            a bobbin movably fitted on said magnetic core;
            a wire would on said bobbin; and
            a cylindrical member for leading said wire along an axis of said cylinder body, said cylindrical member being unitarily formed with said bobbin.

2. The key system of claim 1, wherein said key comprises:
    a resonance circuit provided in said head;
    a key core; and
    a key coil would on said key core and connected to said resonance circuit, said key core positions close to said magnetic core of said cylinder means when said key is inserted into said key insertion hole of said cylinder body.

3. The key system of claim 2, wherein said resonance circuit is an inductance/capacitance circuit having an intrinsic resonance frequency performing as said key information.

4. The key system of claim 1, further comprising:
    a rotor case for accommodating said rotor and said magnetic core, said rotor case being secured to said rotor, said rotor case being provided with a slit through which a cylindrical member of said magnetic field generation means passes; and
    a cover for covering said rotor, said cover being provided with a through hole through which said cylindrical member of said magnetic field generation means.

5. The key system of claim 1, wherein said magnetic core is substantially semicircular in shape.

6. The key system of claim 1, wherein said magnetic core is formed of ferrite.

7. The key system of claim 1, further comprising means for illuminating said key and said key insertion hole of said cylinder body, said illuminating means comprising:

a bulb for emitting light;

a bulb case for mounting said bulb, said bulb case being slidably mounted on said cylinder body;

an illumination ring secured to said bulb case, said illumination ring surrounding said key insertion hole and said key when said key is inserted, said illumination ring guiding said light emitted from said bulb.

8. The key system of claim 2, wherein a gap between said magnetic core of said cylinder means and said core of said key is defined within a range between 6–24 mm.

* * * * *

UNITED STATES PATENT AND TRADEMARK OFFICE
CERTIFICATE OF CORRECTION

PATENT NO. : 5,117,097
DATED : May 26, 1992
INVENTOR(S) : Takashi Kimura et al.

It is certified that error appears in the above-identified patent and that said Letters Patent is hereby corrected as shown below:

Claim 2, column 8, line 50, change "would" to --wound--.

Claim 8, column 10, line 10, change "6-24" to --6-12--.

Signed and Sealed this

Twenty-first Day of September, 1993

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 5,117,097
DATED : May 26, 1992
INVENTOR(S) : Takashi Kimura et al.

It is certified that error appears in the above-indentified patent and that said Letters Patent is hereby corrected as shown below:

On title page, item [75], insert --Taketoshi Sakurai, Aichi, Japan--.

Signed and Sealed this

Sixth Day of September, 1994

Attest:

BRUCE LEHMAN

*Attesting Officer*   *Commissioner of Patents and Trademarks*